United States Patent [19]

Irick

[11] Patent Number: 5,245,251
[45] Date of Patent: Sep. 14, 1993

[54] DAYTIME RUNNING LIGHTS CONVENIENCE FEATURE

[75] Inventor: W. Thomas Irick, New Haven, Ind.

[73] Assignee: Navistar International Transportation Corp., Chicago, Ill.

[21] Appl. No.: 807,692

[22] Filed: Dec. 16, 1991

[51] Int. Cl.$^5$ .............................................. B60Q 1/04
[52] U.S. Cl. ...................................... 315/82; 315/77; 315/83; 307/10.8
[58] Field of Search ............................ 315/77, 82, 83; 307/10.1, 10.8, 112, 139

[56]  References Cited

U.S. PATENT DOCUMENTS

| | | | |
|---|---|---|---|
| 1,130,969 | 3/1915 | Fleet | 315/191 |
| 1,222,215 | 4/1917 | Klein | 315/191 |
| 1,269,954 | 6/1918 | Nigh | 315/80 |
| 3,068,378 | 12/1962 | Bishop et al. | 315/80 |
| 3,262,011 | 7/1966 | Cones | 315/82 |
| 3,305,695 | 2/1967 | Late | 315/82 |
| 3,391,301 | 7/1968 | Poznik | 315/83 |
| 3,440,487 | 4/1969 | Wu et al. | 315/77 |
| 3,706,006 | 12/1972 | Miller | 315/83 |
| 4,684,819 | 8/1987 | Haag et al. | 307/10 R |
| 4,686,423 | 8/1987 | Eydt | 315/80 |
| 4,713,584 | 12/1987 | Jean | 315/83 |
| 4,723,095 | 2/1988 | Svazas et al. | 315/83 X |
| 4,841,199 | 6/1989 | Irie | 315/83 |
| 4,928,036 | 5/1990 | Abboud | 315/82 |
| 4,949,012 | 8/1990 | Irick et al. | 315/82 |
| 5,030,884 | 7/1991 | Roussey et al. | 315/82 X |

FOREIGN PATENT DOCUMENTS 869670  4/1971  Canada.
932790  8/1973  Canada.

Primary Examiner—Eugene R. LaRoche
Assistant Examiner—Son Dinh
Attorney, Agent, or Firm—Dennis K. Sullivan

[57] ABSTRACT

A convienience feature is added to a DRL circuit to enable the driver to temporarily override the DRL system in situations where it is appropriate, such as when the vehicle is approaching weigh scales or entering a tunnel. The convenience feature is embodied in a convenience circuit that is interposed in the current feed path to the DRL circuit. The convenience circuit comprises a momentary switch that is actuated by the driver and a timing relay module that is responsive to the actuation of the momentary switch.

9 Claims, 1 Drawing Sheet

DAYTIME RUNNING LIGHTS CONVENIENCE FEATURE

BACKGROUND OF THE INVENTION

This invention relates to daytime running lights for automotive vehicles. Daytime running lights (DRL) are presently mandated by law and/or regulation in Canada. In essence, the mandate requires that all automotive vehicles have exterior lamps which illuminate automatically without express affirmative action by the driver of the vehicle whenever the vehicle is in operation. One type of DRL system comprises means for causing the usual headlamps of the vehicle to be energized with a voltage significantly less than rated voltage whenever the vehicle is in operation. Examples of DRL systems of this type are disclosed in commonly assigned U.S. Pat. Nos. 4,949,012 and 5,030,884. By operating the headlamps at a reduced voltage, which by way of example may be one-half rated voltage, an acceptable daytime running indication is given, and the lamp filament life is less significantly affected than if the headlamps were energized at full rated voltage during DRL operation. A feature of known DRL systems provides for DRL to be interrupted whenever the vehicle is idling with the parking brake set and/or the transmission in neutral gear.

At the present time, DRL is not mandated in the United States. However, some truck fleet owners have equipped their newly ordered United States fleet vehicles with DRL systems of the same type presently used to comply with Canadian vehicle requirements. Actual fleet experience with usage of such DRL systems has resulted in two revelations.

The first revelation arises as a consequence of the long-established custom of the driver of a first vehicle signaling the driver of a second vehicle which has just passed the first vehicle in the same direction of travel to indicate that the second vehicle has cleared the first vehicle by a distance sufficient to allow the second vehicle to re-enter the same lane as the first vehicle. This signaling custom, which is sometimes referred to as flashing, is performed by the driver of the first vehicle momentarily turning its headlamps on and off, perhaps even two or three times in succession. Experience with this custom in a vehicle equipped with a DRL system such as those referred to above has revealed that the signaling is not as distinctive, and hence may not be as readily perceived by the driver of the second vehicle, as in the case of a non-DRL-equipped vehicle because the first vehicle's headlamps no longer switch from zero illumination to full illumination, but rather from a level of partial illumination to one of full illumination.

The second revelation arises as a consequence of certain situations where the driver of a DRL-equipped vehicle is required to turn the vehicle headlamps completely off while the vehicle is operating in gear. An example of such a situation is found when a heavy truck or highway tractor-trailer has turned off an expressway, or highway, to enter a weigh scale station where the vehicle is driven onto scales and weighed for compliance with mandated vehicle highway weight limits. Certain tunnels may also have a requirement that vehicles turn their headlamps completely of during through-transit. In situations like these it is impossible for the driver to turn the headlamps completely off because in the case of approaching weigh scales, the vehicle must be driven onto the scales and therefore remain in gear during the approach, and in the case of transit through a tunnel, the vehicle must also obviously remain in gear under power.

While a simple response to the foregoing revelations would be to install an on-off switch which the driver would operate to defeat the DRL system on such occasions, this is not deemed to be acceptable for several reasons. One, it could prevent a new vehicle from being sold in Canada due to possible non-compliance with the DRL mandate in that country; two, the DRL system will remain defeated past the temporary need to do so if the driver forgets to turn the on-off switch back on.

It is toward providing a new and useful convenience feature which responds to the foregoing revelations that the present invention is directed.

SUMMARY OF THE INVENTION

Briefly and in a general way, the present invention provides a means for temporarily overriding the DRL system at the instigation of the driver in appropriate situations while guarding against the possibility that the override will be prolonged beyond its intended duration. A presently preferred embodiment of the present invention modifies an existing DRL system by inserting the combination of a two-position momentary switch and a timing device in circuit with the power feed to the DRL system such that when the two-position momentary switch is in the one of its two positions that corresponds to its non-actuated position, it allows the DRL system to operate in the usual manner, i.e. the headlamps automatically illuminate at reduced intensity whenever the vehicle is running unless the vehicle is not in gear and/or the parking brake is applied, and such that when the two-position momentary switch is operated to the other of its two positions that corresponds to its actuated position, it interrupts the power feed to the DRL system for a period of time equal to the sum of the time that it remains in the actuated position and the time imposed by a time delay relay portion of the timing device.

The two-position momentary switch is one which is mechanically biased to the non-actuated position and will assume its actuated position only so long as it is held in that latter position by the driver. An example of such a switch is a spring-biased push-button switch or a spring-biased lever switch which can be manually operated by the driver. If the delay time is to be made equal to zero, the timing device portion of the circuit can be eliminated in which case, the convenience feature will include only a two-position momentary switch that has only a single set of contacts and is spring-biased to the non-actuated position.

The preferred embodiment of the invention that will be disclosed herein will be described in association with DRL systems of the types disclosed in the aforementioned commonly assigned patents. The accompanying drawing figure presents a preferred embodiment of the invention in accordance with the best mode contemplated at this time for carrying out the invention.

DESCRIPTION OF THE PREFERRED EMBODIMENT

Figure 1:
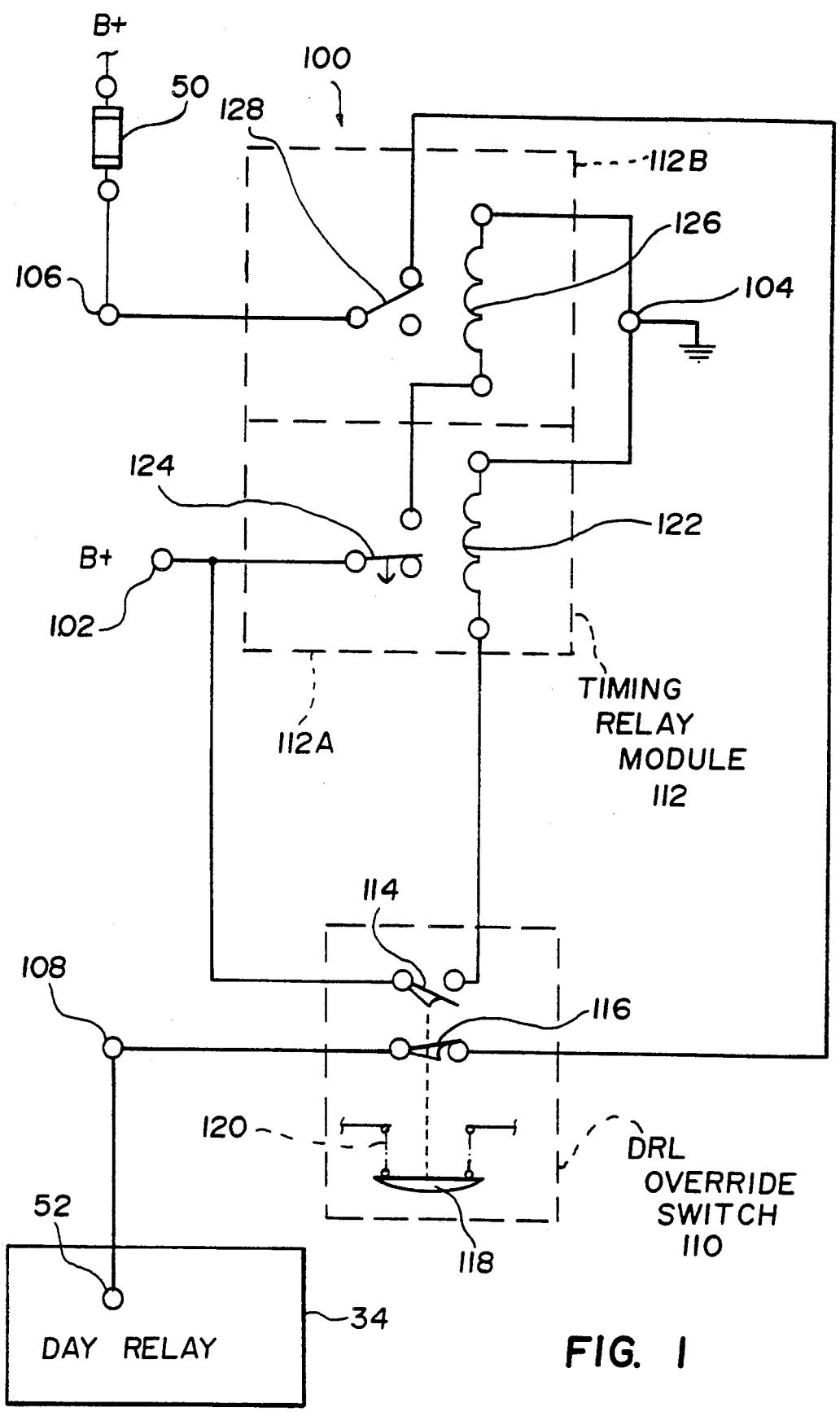
FIG. 1 is a schematic electric circuit diagram of the convenience feature of the present invention for a DRL system and is depicted in association with a portion of a DRL system.

FIG. 1 illustrates a circuit 100 embodying the convenience feature of the present invention in association with the relevant portion of a DRL system of the type that is disclosed in the aforementioned commonly assigned patents. For purposes of the present disclosure, the contents of those patents are incorporated herein by reference, and anyone who wishes to do so may consult them for full details.

The relevant portion of the DRL system comprises a current overload protection device, such as the fuse 50, and the day relay 34 in those patents. Day relay 34 comprises a coil 44 that controls a movable contact 42 which is normally open between a first terminal 52 of the relay and a second terminal (unnumbered in the incorporated-by-reference patents, 53 herein) of the relay. In the DRL systems of those patents the B+ power supply terminal is connected through fuse 50 directly to the terminal 52 of day relay 34 so that the DRL system provides a current path for electric current to energize the headlamps when the daytime running mode of operation is in effect. The daytime running mode is in effect when coil 44 is energized to operate contact 42 to close the circuit between terminals 52 and 53. Terminal 53 connects to the vehicle's headlamps, as in the incorporated-by-reference patents. Coil 44 is energized under conditions indicative of daytime running of the vehicle, namely when the headlamp switch is off and the vehicle is running, as described in the incorporated-by-reference patents. The closing of contact 42 between terminals 52 and 53 causes the headlamps to illuminate at reduced intensity for indicating daytime running. When the convenience feature of the present invention is incorporated into that DRL system, the wiring connection between fuse 50 and terminal 52 of day relay 34 is broken to receive circuit 100. Because circuit 100 is not inserted into a portion of the circuitry that controls coil 44, contact 42 remains closed between terminals 52 and 53 so long as the daytime running mode is in effect regardless of whether the convenience feature that is provided by circuit 100 is being invoked. Hence, so long as the daytime running mode is in effect, contact 42 remains closed between terminals 52 and 53 when the convenience feature is invoked to temporarily interrupt the current flow to the headlamps, as will become more apparent from the ensuing description.

Circuit 100 comprises four terminals 102, 104, 106, and 108 via which it connects with the DRL system and the B+ power supply. Terminal 102 connects to the B+ terminal of the power supply; terminal 104, to ground; terminal 106 to the load side of fuse 50; and terminal 108 to terminal 52 of day relay 34. Circuit 100 further comprises a DRL override switch 110 and a timing relay module 112.

DRL override switch 110 is a momentary type switch and comprises a normally open set of contacts 114, a normally closed set of contacts 116, an actuator 118, and a bias spring 120. FIG. 1 illustrates the normal, non-actuated position of switch 110. Actuator 118 is adapted to be manipulated by the driver of the vehicle, and by way of example, may be either a lever or a push button. When operated by the driver from the non-actuated position to the actuated position, actuator 118 operates contacts 114 from open to closed and contacts 116 from closed to open, while increasingly compressing spring 120. So long as the driver maintains actuator 118 actuated in this manner against the spring force that opposes the actuation, contacts 114 will remain closed and contacts 116 open. As soon as the driver releases the actuator, spring 120 will return it to the non-actuated position, re-opening contacts 114 and re-closing contacts 116 in the process.

Timing relay module 112 comprises two sections 112A and 112B. Section 112A performs a timing function, and is illustrated in the form of a time delay relay which executes a time delay upon de-energization. Thus it is schematically shown to comprise a coil 122 and a set of normally open contacts 124 although it should be understood that an actual embodiment of the invention could comprise an electronic equivalent of the electro-mechanical device. Contacts 124 close coincident with the energization of coil 122, but upon de-energization of coil 122, do not re-open (i.e., remain closed) for a certain amount of time after energization of the coil ceases.

Section 112B comprises a non-time-delay relay and is schematically depicted to comprise a coil 126 and a set of normally closed contacts 128. Contacts 128 open and close coincident with the energization and de-energization of coil 126.

With circuit 100 incorporated into the DRL system: contacts 128 and contacts 116 are connected in series and the load side of fuse 50 is connected through the series-connected contacts 128 and contacts 116 to terminal 52 of day relay 34; the B+ terminal of the power supply is connected through contacts 114 to one side of coil 122; the other side of coil 122 is connected to ground; the B+ terminal of the power supply is connected through contacts 124 to one side of coil 126; and the other side of coil 126 is connected to ground.

During use of the DRL system without actuation of the convenience feature, electric current can be conducted as usual through fuse 50 to terminal 52 of day relay 34 because contacts 128 and contacts 116 are closed. Thus so long as the convenience feature remains non-actuated, the DRL system will operate in the same manner as described in the referenced patents.

The convenience feature is actuated by the driver operating switch 110 to its actuated position. Such operation of switch 110 immediately interrupts the current to terminal 52 of day relay 34 because contacts 116 open. Essentially concurrently with the opening of contacts 116, contacts 114 close to cause coil 122 to be energized. The energization of that coil immediately closes contacts 124 (remember that there is no delay upon energization, only upon de-energization), and the closing of contacts 124 immediately causes coil 126 to be energized. The energization of coil 126 opens contacts 128 so that the latter provides an additional open circuit between fuse 50 and terminal 52, which is in addition to the open circuit created by the opening of contacts 116.

The interruption of current to terminal 52 terminates the illumination of the daytime running lamps of the vehicle, which in the case of the DRL systems of the referenced patents comprise series-connected pairs of headlamps each of which had been operating at substantially half of its rated voltage during normal daytime running. Thus in a situation where a vehicle is approaching weigh scales or a tunnel, actuation of switch 110 of the convenience feature is effective to turn the daytime running lamps off. In a situation where the driver wishes to signal a second vehicle which has just passed his own vehicle that it is okay for that second vehicle to pull back into the same lane as his own vehicle, the actuation of the convenience feature switch will enable such ensuing signaling to comprise switching the headlamps in a more distinctive manner from no illumination to full illumination, rather than in a less distinctive manner from partial illumination to full illumination.

The specific implementation which has been disclosed for circuit 100 will, because of the presence of contacts 116, be effective to interrupt the usual DRL system so long as the driver maintains switch 110 actuated. The inclusion of timing relay module 112 and the additional set of contacts 114 temporarily seals the current path to day relay terminal 52 open by providing for the interruption to continue for a certain limited amount of time after the driver has ceased to maintain switch 110 actuated.

Upon the driver releasing actuator 118, spring 120 promptly re-closes contacts 116 and re-opens contacts 114. The re-closing of contacts 116 would re-connect terminal 52 to fuse 50, but for the fact that contacts 128 are caused to remain open so long as contacts 124 keep coil 126 energized, and coil 126 is caused to remain energized for a certain limited amount of time after coil 122 has been de-energized by the re-opening of contacts 114 because of the time delay upon de-energization that is provided in section 112A. Thus, it is unnecessary for the driver to hold actuator 118 actuated in order to cause an interruption of the DRL operation for a certain limited period of time. The driver need only momentarily actuate, and then release the actuator to cause such a limited time interruption to occur. Since, section 112A has an inherent predetermined time delay upon de-energization, the total time for which the DRL operation is interrupted will be equal to the sum of the time for which the driver holds actuator 118 actuated and the predetermined delay time that inherently exists in section 112A. By way of example, such inherent delay time may be one or two minutes, and it is fully contemplated that section may be provided with a conventional preselectable feature that allows the driver and/or the fleet operator to set a desired inherent time delay for section 112A.

The foregoing description of operation has assumed that both contacts 114 and contacts 116 always operate substantially in unison. An enhancement of the operation may be obtained by constructing switch 110 such that the operation of the contacts 114 and 116 may be staggered such that contacts 116 can be opened by a partial actuation of actuator 118 without necessarily also closing contacts 114. In such a case, it is possible for the DRL to be temporarily interrupted without also invoking the time delay that is provided by timing relay module 112. Of course if it is desired to also invoke the time delay provided by module 112, the switch is actuated in such a manner that both contacts 114 and 116 are operated by the actuator.

If it is deemed unnecessary for any delay to be provided after the momentary switch 110 has been actuated and released by the driver, the convenience circuit may be simplified by omitting timing relay module 112 and replacing switch 110 by one which is like the illustrated switch 110 but omits contacts 114. Thus, this simplified circuit will comprise only the single set of contacts 116 connected between terminals 106 and 108 without more.

While the illustrated circuit in FIG. 1 represents the presently preferred embodiment, contacts 116 could be considered redundant to contacts 128 if the convenience feature is to always include the time delay imposed by module 112 in which case contacts 116 could be omitted from switch 110.

The terminology and symbolism that have been used herein to present the principles of the invention are intended to be construed by way of illustration, and not necessarily limitation. For example the use of the term "module" to describe timing relay module 112 should not be construed to necessarily imply that a system embodying the inventive principles must have a readily identifiable "module" as such consisting of the specific elements described therein. Moreover, the use of electromechanical symbols to designate the contents of module 112 should not necessarily be construed to imply that such contents must be strictly electromechanical in nature. Indeed, such electromechanical devices have well-known electronic equivalents. It should be understood and appreciated that embodiments of the inventive subject matter other than those expressly disclosed herein may fall within the scope of the following claims. It should be further understood and appreciated that the invention may appear as a part of a complete new DRL system, or it may been added onto a DRL that is already in use.

What is claimed as the invention is:

1. In a daytime running lights (DRL) system which comprises an electric circuit that automatically illuminates exterior running lamps on an automotive vehicle in response to indicia of the daytime operation of the automotive vehicle and that comprises a current path, including normally open DRL switch means that is operated closed in response to indicia of daytime operation of the vehicle, through which electric current for the daytime illumination of such lamps is conducted, a convenience circuit for enabling a driver of the vehicle to temporarily override such automatic illumination of such lamps while said DRL switch means remains closed, said convenience circuit comprising a convenience switch means having an actuator operable by the driver from a non-actuated position to an actuated position and switch-responsive means which is interposed in said current path and which is responsive to said actuator of said convenience switch means being operated to actuated position to temporarily interrupt said current path.

2. In a daytime running lights (DRL) system, a convenience circuit as set forth in claim 1 in which said switch-responsive means comprises timing means which is effective to impose a certain limited time interruption on the operation of said DRL system upon said actuator of said convenience switch means returning from actuated position to non-actuated position.

3. In a daytime running lights (DRL) system which comprises an electric circuit that automatically illuminates exterior running lamps on an automotive vehicle in response to indicia of the daytime operation of the automotive vehicle and that comprises a current path, including normally open DRL switch means that is operated closed in response to indicia of daytime operation of the vehicle, through which electric current for the daytime illumination of such lamps is conducted, a convenience circuit for enabling a driver of the vehicle to temporarily override such automatic illumination of such lamps while said DRL switch means remains closed, said convenience circuit comprising a momentary switch that is interposed in said current path, said momentary switch comprising a set of normally closed contacts interposed in said current path so as to allow DRL operation when closed and disallow DRL operation when open, an actuator that is accessible to and operable by the driver from non-actuated position to actuated position for causing said set of normally closed contacts to operate from closed to open, and resilient bias means for resiliently biasing said actuator toward its non-actuated position so that after the driver has ceased to operate said actuator, said actuator returns to its non-actuated condition and allows said set of contacts to return to closed.

4. In a daytime running lights (DRL) system which comprises an elecric circuit that automatically illuminates exterior running lamps on an automotive vehicle in response to indicia of the daytime operation of the automotive vehicle and that comprises a current path, including normally open DRL switch means that is operated closed in response to indicia of daytime operation of the vehicle, through which electric current for the daytime illumination of such lamps is conducted, a convenience circuit for enabling a driver of the vehicle to temporarily override such automatic illumination of such lamps while said DRL switch means remains closed, said convenience circuit comprising a momentary switch, said momentary switch comprising a set of normally closed contacts interposed in said current path so as to allow DRL operation when closed and disallow DRL operation when open, an actuator that is accessible to and operable by the driver from non-actuated position to actuated position for causing said set of normally closed contacts to operate from closed to open, and resilient bias means for resiliently biasing said actuator toward its non-actuated position so that after the driver has ceased to operate said actuator, said actuator returns to its non-actuated condition and allows said set of contacts to return to closed, and said convenience circuit further including sealing means for temporarily sealing said current path open for a limited amount of time after said contacts have returned from open to closed.

5. In a daytime running lights (DRL) system, a convenience circuit as set forth in claim 4 in which said sealing means comprises a second set of normally closed contacts disposed in said current path in series with said first-mentioned set of normally closed contacts and timing means which is responsive to the operation of said actuator from non-actuated position to actuated position for causing said second set of normally closed contacts to open and is also responsive to return of said actuator from actuated position to non-actuated position for causing said second set of normally closed contacts to remain open for said limited amount of time after said first-mentioned set of normally closed contacts has returned from open to closed.

6. In a daytime running lights (DRL) system, a convenience circuit as set forth in claim 5 in which said momentary switch further includes a set of normally open contacts which operate from open to closed in response to operation of said actuator from non-actuated position to actuated position and from closed to open in response to return of said actuator from actuated position to non-actuated position, and said timing means further comprises means responsive to the operation of said set of normally open contacts from open to closed to operate said second set of normally closed contacts from closed to open and also responsive to the return of said set of normally open contacts from closed to open to return said second set of normally closed contacts from open to closed upon elapse of said limited amount of time after said first-mentioned set of normally closed contacts have returned from open to closed.

7. In a daytime running lights (DRL) system, a convenience circuit as set forth in claim 6 in which said timing means comprises a relay which contains said second set of normally closed contacts and which contains a coil that controls the operation of said second set of normally closed contacts.

8. In a daytime running lights (DRL) system, a convenience circuit as set forth in claim 7 in which said timing means further includes a timing device that is operatively connected with said coil of said relay to cause said coil to be energized during said limited amount of time and to be de-energized upon elapse of said limited amount of time.

9. In a daytime running lights (DRL) system which comprises an electric circuit that automatically illuminates exterior running lamps on an automotive vehicle in response to indicia of the daytime operation of the automotive vehicle and that comprises a current path, including normally open DRL switch means that is operated closed in response to indicia of daytime operation of the vehicle, through which electric current for the daytime illumination of such lamps is conducted, a convenience circuit for enabling a driver of the vehicle to temporarily override such automatic illumination of such lamps while said DRL switch means remains closed, said convenience circuit comprising a momentary switch that has two sets of contacts, one of said sets being a set of normally closed contacts interposed in said current path so as to allow DRL operation when closed and disallow DRL operation when open, the other of said sets being a set of normally open contacts, said switch comprising an actuator that is accessible to and operable by the driver from non-actuated position to actuated position for causing said set of normally closed contacts to operate from closed to open and said set of normally open contacts to operate from open to closed, and resilient bias means for resiliently biasing said actuator toward its non-actuated position so that after the driver has ceased to operate said actuator, said actuator returns to its non-actuated condition and allows said set of normally closed contacts to return from open to closed and said set of normally open contacts to return from closed to open, and said convenience circuit further comprising a second set of normally closed contacts interposed in said current path in series with said first-mentioned set of normally closed contacts, and timing circuit means operated by said normally open set of contacts to control said second-mentioned set of normally closed contacts such that when said set of normally open contacts operates from open to closed, said second set of normally closed contacts operates from closed to open, and when said set of normally open contacts returns from closed to open, said second set of normally closed contacts operate from open to closed only after a limited amount of time has elapsed after said set of normally open set of contacts has returned to open.

* * * * *